United States Patent [19]
Swan

[11] Patent Number: 5,704,100
[45] Date of Patent: Jan. 6, 1998

[54] RETAINING CLIP SYSTEM

[75] Inventor: David A. Swan, Shoreview, Minn.

[73] Assignee: Federal-Hoffman, Inc., Anoka, Minn.

[21] Appl. No.: 609,735

[22] Filed: Mar. 1, 1996

[51] Int. Cl.[6] ............................. E05C 9/00; F16B 21/00
[52] U.S. Cl. ........................... 24/656; 24/546; 24/658; 411/522
[58] Field of Search ..................... 24/656, 657, 658, 24/652, 546, 547, 67.9, 3.6, 3.11, 3.12; 411/522, 523, 514, 509, 508, 913

[56] References Cited

U.S. PATENT DOCUMENTS

| | | | |
|---|---|---|---|
| 641,234 | 1/1900 | Ross | 24/658 |
| 1,160,190 | 11/1915 | Murray | 24/547 |
| 1,764,950 | 6/1930 | Griner | 24/546 |
| 1,976,623 | 10/1934 | Monroe et al. | 81/64 |
| 3,505,709 | 4/1970 | Tirone | 24/546 |
| 4,716,632 | 1/1988 | Perl | 24/546 |
| 4,733,987 | 3/1988 | Tomlinson et al. | 411/522 |
| 5,172,944 | 12/1992 | Munich et al. | |
| 5,433,930 | 7/1995 | Taschner | 24/657 |
| 5,451,082 | 9/1995 | Murai | 24/658 |

FOREIGN PATENT DOCUMENTS

| | | | |
|---|---|---|---|
| 37 10 563 C2 | 7/1992 | Germany. | |
| 93 05 893.4 | 6/1993 | Germany. | |
| 0452958 | 5/1968 | Switzerland | 24/3.6 |
| 0287753 | 3/1928 | United Kingdom | 411/522 |

Primary Examiner—Victor N. Sakran
Attorney, Agent, or Firm—Merchant, Gould, Smith, Edell, Welter & Schmidt

[57] ABSTRACT

The present invention is a mounting clip system that is operable to mount two foreign surfaces to one another. The mounting clip system includes a cylindrical member with a first and second end with the first end adapted for mounting the cylindrical member to a foreign surface and the second end adapted for engaging the housing; this housing has a mounting surface, a slot formed therethrough and an aperture located in opposing arrangement to the mounting surface; and a retaining pin adapted to attach to the housing through the slot formed therein and releasably attached to the cylindrical member when the cylindrical member is inserted into the aperture of the housing.

19 Claims, 4 Drawing Sheets

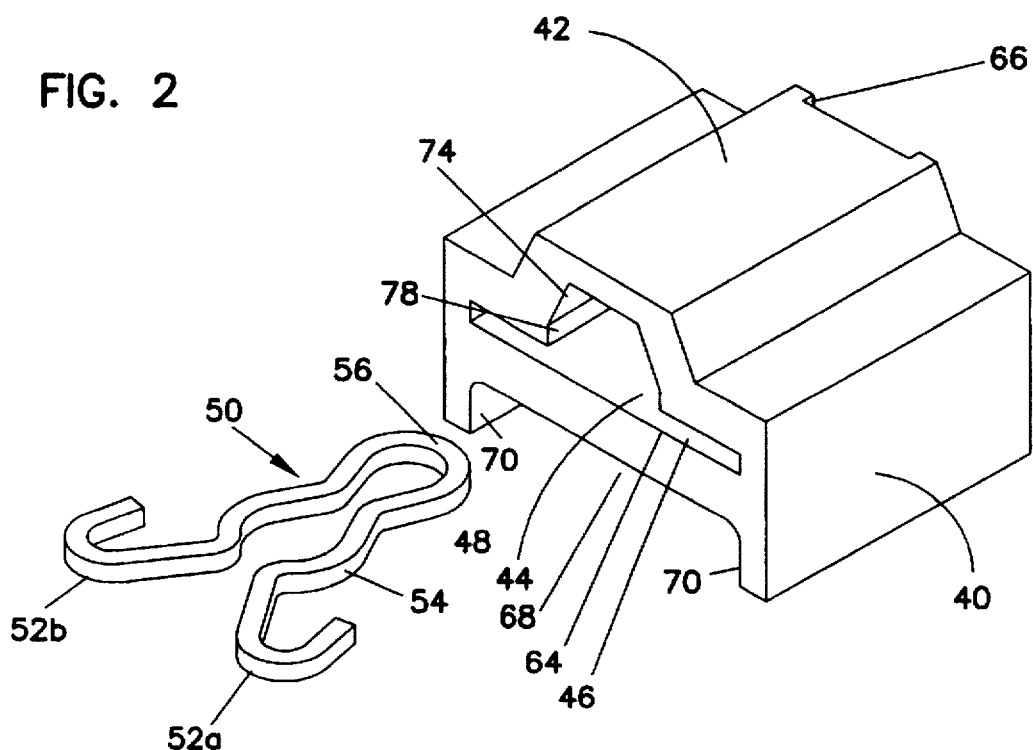
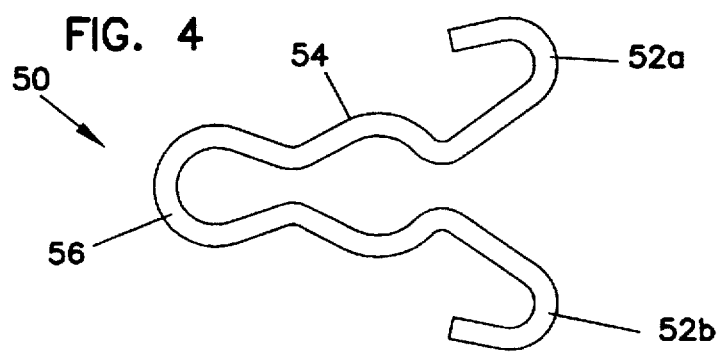
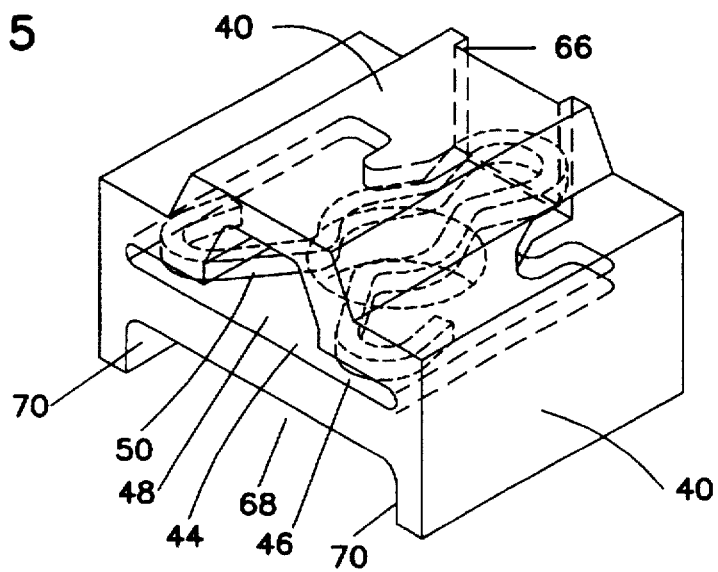

5,704,100

RETAINING CLIP SYSTEM

BACKGROUND OF THE INVENTION

1. Field of the Invention

The present invention relates to a mounting or retaining clip system, and in particular to a clip having a removable and reattachable retainer portion.

2. Description of the Prior Art

Devices for mounting and retaining members against a mounting surface are well known. Screws, rivets, bolts, retaining pins and other mounting hardware devices are well known. In addition, buckles, straps, and cotter pins provide for attaching an article to a surface in a releasable manner.

Although prior art mounting devices work well for their intended purpose, the prior art devices do not adequately provide for retaining an article against a mounting surface and easily releasing the members. Retaining pins often must be bent to function as a retainer and are difficult to remove once inserted. The use of a modified cotter pin inserting into a hole in a stud may provide retaining and reuse of the pin. However, the cotter pin must be fully removed for releasing and is easily lost, especially when the size of the pin becomes quite small.

It can be seen, then, that a new and improved retaining clip system is needed which provides for releasably retaining a first article against a mounting surface. In particular, such a system should provide for reuse of the elements so that the retaining system elements may be reused without removal of the pin portion from another element. Such a system should also adapt to a variety of configurations and provide for easy assembly and reuse. The present invention addresses these needs as well as others associated with retaining clip systems.

SUMMARY OF THE INVENTION

The present invention is directed to a retaining clip system for detachably retaining an article against a mounting surface. The retaining clip system includes a stud member adapted for mounting to a surface and a housing adapted to retain articles against the mounting surface. The housing is configured to receive the stud member and a retaining pin for releasably locking the housing to the stud member. The system also provides for retaining the pin once inserted into the housing so that the pin need not ever be fully removed.

These features of novelty and various other advantages which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference letters and numerals indicate corresponding elements throughout the several views:

FIG. 2 shows a perspective view of the housing and retaining pin for the mounting clip system shown in FIG. 1 with the retaining pin positioned at a first side of a slot formed in the housing;

FIG. 4 is a top view of the retaining pin for the mounting clip system shown in FIG. 1;

FIG. 5 is a perspective view of the housing for the mounting clip system shown in FIG. 1 with the slot and the retaining pin inserted in the slot shown in phantom;

DETAILED DESCRIPTION OF THE PREFERRED EMBODIMENT

Figure 1:
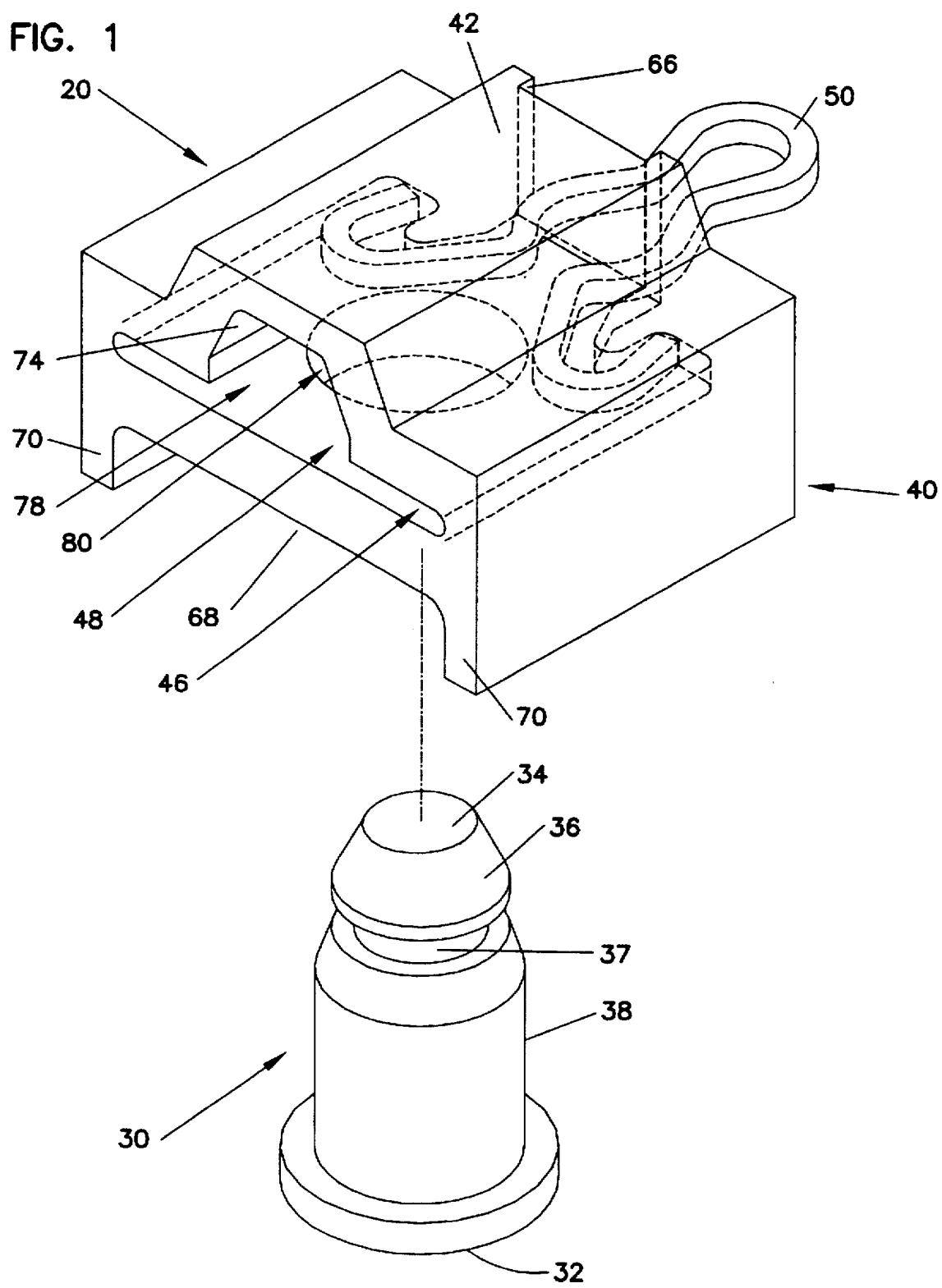
FIG. 1 shows an exploded perspective view of a mounting clip system according to the principles of the present invention with a cylindrical member removed and a retaining pin partially removed.

Referring now to the drawings, and in particular to FIG. 1, there is shown a mounting and retaining clip system, designated generally by the numeral 20. The mounting clip system includes a stud member a housing 40 and a retaining pin 50.

In a preferred embodiment, the stud member 30 is cylindrical and includes a widened base portion 32 at a first end of the member 30. However, it is foreseen that other stud cross-sections may also be used which connect the stud 30 to the housing 40 and retaining pin 50. The base 32 generally mounts against the mounting surface and may be welded, glued, integrally formed into the surface, or otherwise attached. A shaft portion 38 extends upward from the base 32 to a second end 34. The second end 34 includes a tapering portion 36 which provides alignment for easier assembly, as explained hereinafter. Below the tapered portion 36 is an annular channel 37 extending around the periphery of the shaft portion 38.

Figure 7:
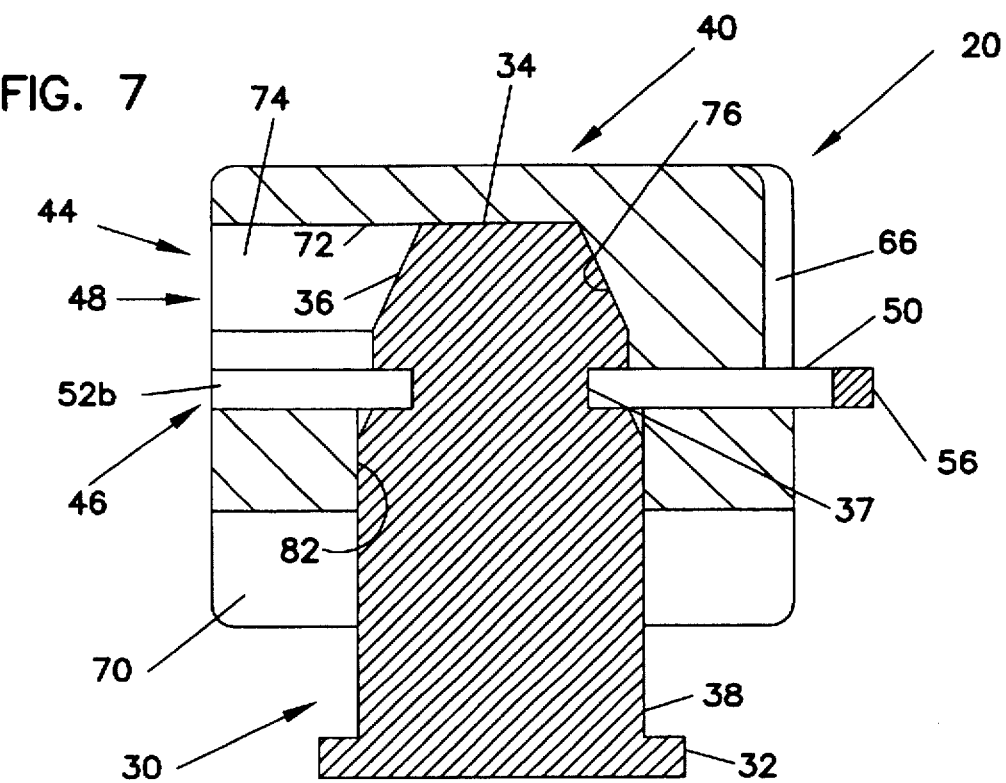
FIG. 7 shows a side sectional view of the mounting clip system with the cylindrical member retained by the pin in the housing, according to the principles of the present invention.

The housing includes 40 a slot 44 extending therethrough transverse to the mounting axis of the stud 30, as also shown in FIG. 7. The slot 44 includes a widened lower portion 46 and a narrow portion 48. The widened portion 46 is configured for receiving the pin 50, while the narrow portion 48 is configured for receiving the second end 34 of the cylindrical member 30. In a preferred embodiment, the narrow portion 48 has an upper surface 72 and angled sides 74 and an end 76 to receive and substantially align the tapered end portion 36 of the stud member 30.

Figure 3:
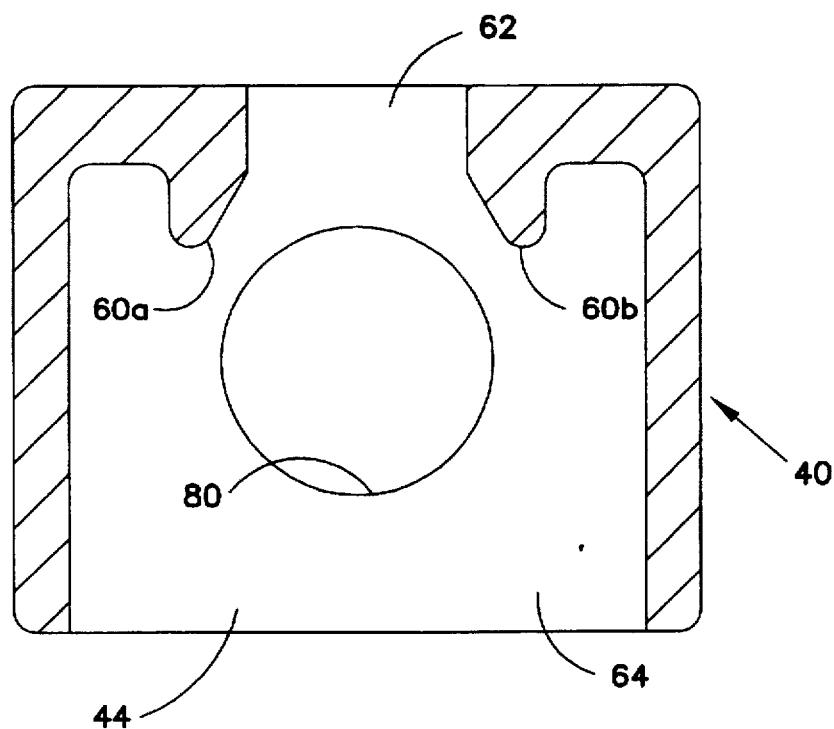
FIG. 3 is top sectional view of the housing for the mounting clip system shown in FIG. 1 taken through the slot in the housing.
Figure 6:
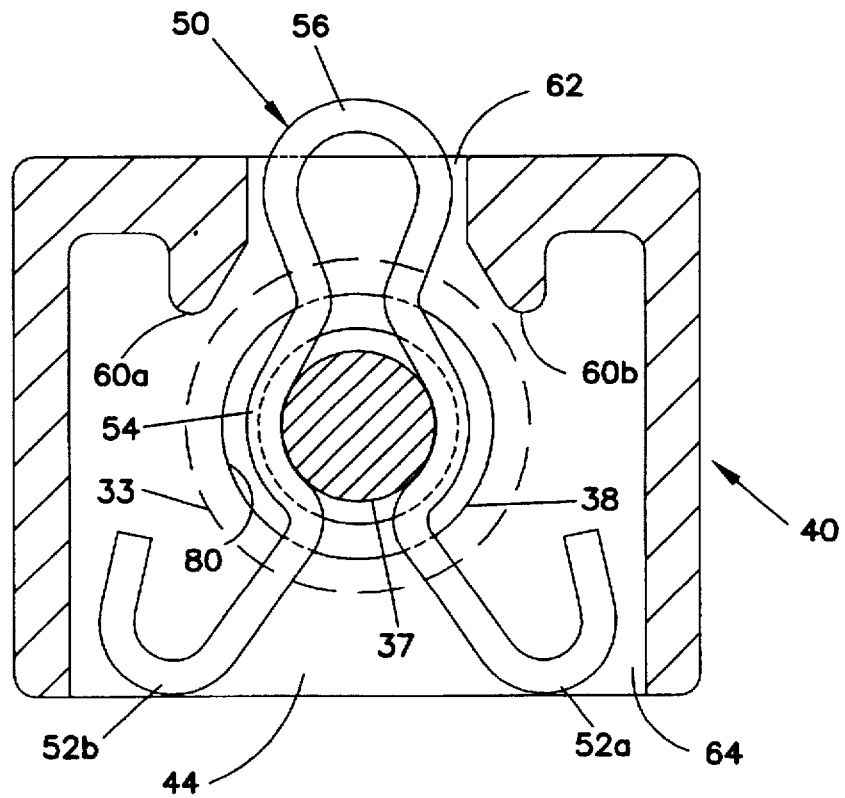
FIG. 6 is a top sectional view of the mounting clip system shown in FIG. 1 taken through the slot with the retaining engaging the cylindrical member.

Referring now to FIGS. 3 and 6, the slot 44 intercepts an orifice 80 extending from the underside of the housing 40. In a preferred embodiment, the orifice 80 has a diameter substantially equal to the outer diameter of the shaft portion 38 of the cylindrical member 30. The slot 44 includes a widened first end 64 and a narrowed second end 62 at the lower slot portion. The widened end 64 is of a width capable of receiving the entire portion of the pin 50, while the narrow opening at the second end 62 receives only the narrowed end of the pin 50, as explained hereinafter. As shown in FIGS. 1, 2 and 7, the housing 40 includes a recess 66 extending from the upper surface 42 to the narrowed opening 62 in the slot 44. The slot 44 also includes barbs 60a and 60b at either side of the narrowed opening at the second end 62, as shown again in FIGS. 3 and 6. The lower portion of the housing 40 includes a retaining surface 68 inside retaining portions 70, as shown in FIGS. 1, 3 and 5.

Referring to FIG. 4, the pin 50 includes extended leg portions 52a and 52b which spread outward from a longitudinal axis of the pin 50 in a substantially mirror image. The legs 52a and 52b include hook portions, which are configured for engaging the barbs 60a and 60b, as explained hereinafter. The legs 52a and 52b converge to a narrow portion and then diverge to form a stud member receiving section 54 with an enlarged opening. The pin 50 then converges at a second point along the pin's longitudinal axis and diverges slightly to form a head portion 56 opposite the leg portions 52.

In use, the cylindrical member 30 attaches to a mounting surface. If the article being retained against the mounting surface is slidably retained, the article would include a slot for receiving the stud 30. Several retainer clips 20 may be linearly aligned with several corresponding slots formed in the article providing for sliding movement of the retained article within a limited range. If the retained article in not slidably mounted, it can be appreciated that the housing 40 may be integrally formed as part of the retained article. When the article has been placed on the cylindrical member, the housing 40 may be attached.

Prior to assembly of the housing 40 to the cylindrical member 30, the pin 50 is inserted into the widened portion 46 of the slot 44. As shown in FIG. 2, the pin 50 is aligned with the head portion 56 facing toward the narrowed opening 62 of the slot 44 and the pin 50 is slid into the widened portion 64 of the slot 44. The pin 50 is aligned so that the stud receiving section 54 is aligned with the orifice 80, as shown in FIG. 5. The housing 40 is then pressed onto the stud 30. The tapering end portion 36 engages the stud receiving section 54, which flexes slightly outward. The legs at the stud receiving section 54 are spread outward sufficiently so that the stud 30 is inserted until the pin 50 aligns with the channel 37. When this alignment occurs, the stud receiving section 54 springs inward to its normal position and into the channel 37, as shown in FIGS. 6 and 7. If an attempt is made to pull the stud 30 outward in this position, the pin 50 engages the straight sides of the channel 37 and prevents removal of the stud 30.

The housing may also be mounted to the stud 30 in an alternative method wherein the pin 50 is first slid substantially entirely into the housing slot 44 until the head portion 56 extends out beyond the narrowed opening 62 of the slot 44, as shown in FIG. 1. In this position, the ends of the leg portions 52a and 52b engage the barb portions 60a and 60b in the slot 44. With the leg portions 52a and 52b engaging the barb portions 60a and 60b, the pin 50 cannot be pulled through the narrowed opening 62.

In this position, as shown in FIG. 1, the orifice 80 is uncovered and can freely accept the stud member 30. The housing 40 is slid onto the stud member 30 until the second end 34 engages the upper surface of the slot 44. At this position, the annular channel 37 formed in the shaft 38 is substantially aligned with the widened lower portion 46 of the slot 44. The pin 50 is also aligned with the annular channel 37. To engage the channel 37 with the pin 50, the pin 50 may be slid from the position shown in FIG. 1 to the retaining position, shown in FIGS. 6 and 7.

At the retaining position, the stud receiving section 54 of the pin 50 encompasses the annular channel 37 of the cylindrical member 30. The converging portions at either end of the stud receiving section 54 bias against the annular channel 37 and retain the pin 50 against the cylindrical member 30. Since the shaft portion 38 has a wider diameter than the opening of the stud receiving section 54, the stud member 30 may not be removed from engagement with the pin 50 and is retained in the housing 40.

In the retaining position, shown in FIG. 6, the head portion 56 of the pin 50 extends beyond the opening 62 and beyond the edge of the housing 40. It will be appreciated that should the housing 40 need to be removed from the stud member 30, the pin 50 may be gripped by the head 56. If need be, a tool or pin may be inserted into the recess 66 and between the head 56 and the housing 40 to pry the pin 50 to a position disengaging the stud member 30, as shown in FIG. 1. This provides for easily removing the pin 50 from engagement with the stud 30 and for reinserting the pin 50 to engage the stud 30, as explained above. In this manner, the pin 50 is retained in the slot 44 and may be used over and over again as the housing 40 is removed and replaced on the stud member 30.

When the retaining clip system 20 is used with a latch bar-type device having a slot formed therethrough for receiving the stud member 30, a bottom retaining surface 68 typically engages the upper surface of the latch bar or other device while side portions 70 extend on either side of the bar to align the latch bar or other article. It can be appreciated that this system provides for alignment of the article being retained and also allows for sliding relative to the mounting clip 20.

Referring to FIG. 7, when the cylindrical member is fully inserted into the housing 40, the second end of the cylindrical member 34 engages the upper surface 72 of the slot 44. In addition, the tapered portion 36 of the cylindrical member 30 engages the angled side portion 74 and the angled end portion 76. The surfaces 74 and 76 align and guide the stud member 30 into proper position and limit relative movement between the stud 30 and the housing 40.

The pin 50 inserts into the widened portion 46 of the slot 48 and engages the annular groove 37. In this position, the head 56 of the pin 50 extends slightly beyond the edge of the housing 40. The recess 66 provides for inserting a tool through the center of the head portion 56 or otherwise gripping the pin 50 for pulling the pin outward to disengage the stud member 30 for separating the stud 30 from the housing 40. However, the barbs 60a and 60b engage the legs portions 52a and 52b to prevent separation of the pin 50 from the housing 40 and provide for replacing the housing 40 on the stud 30 and reusing all components.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A retaining clip system comprising:
    a stud member having a first end and a second end, said first end configured for mounting said stud member to a foreign surface, and said stud member having a channel formed therein proximate said second end;
    a housing having a retaining surface, a slot formed therein extending through said housing, and an aperture extending at least partially through said slot sized to receive said second end of stud member; and
    a retaining pin slidably mounted to said housing in said slot and releasably engaging said channel of said stud member.

2. The retaining clip of claim 1, wherein said slot includes a first end, for inserting said retaining pin, a second end, and barb members intermediate said first and second ends providing for sliding the retaining clip partially through said second end to disengage said stud member and preventing said retaining pin from being removed from said housing through said slot second end.

3. The retaining clip of claim 2, wherein said retaining pin includes leg portions extending toward said slot second end configured for engaging the complementary-shaped restraint of the housing, wherein the second end is prevented from being removed by engaging said leg portions with said barb members.

4. The retaining clip of claim 1, wherein said retaining pin includes a rounded clip spring portion for releasably engaging the channel of the cylindrical member.

5. The retaining clip of claim 4, wherein said retaining pin includes leg portions at least partially bent to engage a complementary-shaped restraint located in the slot of the housing.

6. The retaining clip of claim 1, wherein said retaining pin comprises a portion converging at two locations diverging intermediate the two locations to form an enlarged opening therebetween, and leg portions, wherein at least a segment of said leg portions diverge from one another.

7. The retaining clip of claim 1, further comprising retaining members extending outward from the retaining surface.

8. The retaining clip of claim 7, wherein the retaining members comprises parallel extending portions.

9. The retaining clip of claim 1, further comprising barb members formed at the first end of the slot forming a narrowed opening at the first end of the slot.

10. The retaining clip of claim 1, wherein said pin is configured for continuously engaging an extended portion of said member at opposed sides of the channel substantially laterally to said slot.

11. The retaining clip of claim 10, wherein said pin engages said channel along a continuous arc at each of said opposed sides.

12. A retainer according to claim 1, wherein said pin extends partially beyond said housing when engaging said stud member.

13. The retaining clip of claim 1, wherein said aperture extends through a section of said housing to intersect said slot and wherein the housing above said slot covers said aperture.

14. A mounting clip system comprising:

a housing having a retaining surface, a slot formed therein having a first open end and extending at least partially through said housing, and an aperture extending at least partially through said slot, and barb members formed at a second end of said slot forming a narrowed opening at said second end of the slot; and a retaining pin partially shaped to complement said aperture and configured for inserting into said first open end of said slot and slidably engaging said housing in said slot, wherein said retaining pin is attachable to said housing at a position wherein the complementary-shaped portion of said pin and said aperture align.

15. The mounting clip of claim 14, wherein said retaining pin comprises a portion converging at two locations and diverging in an arc intermediate the two locations to form an enlarged opening therebetween, and leg portions, wherein at least a segment of said leg portions diverge from one another.

16. The mounting clip of claim 14, wherein the housing comprises barb members formed in said slot configured for engaging leg portions formed in the pin.

17. A retainer clip system comprising:

a stud member having a first end and a second end, said first end configured for mounting said stud member to a foreign surface, and said stud member having a channel formed therein proximate said second end;

a housing having a slot formed therein extending from a first open end at least partially through said housing to a second end, and an aperture formed in said housing extending at least partially through said slot sized to receive said second end of said stud member;

a retaining pin slidably mounted in said slot; and, pin retaining means located in said slot for preventing said pin from sliding through said slot second end, wherein said pin engages said stud member in a first position and slides toward said slot second end to a second position whereat said pin retaining means retains said pin and said pin disengages said stud member.

18. A retainer according to claim 17, wherein said slot extends through said housing, and wherein said retaining pin extends partially beyond said slot second end in said first position.

19. A retainer system comprising:

a stud member having a first end and a second end, said first end configured for mounting said stud member to a foreign surface, and said stud member having a channel formed therein proximate said second end;

a housing having a slot formed therein extending through said housing and having an insertion end, and an aperture extending at least partially through said slot sized to receive said second end of said stud member; and a retaining pin slidably mounted in said slot and inserting into said insertion end, and releasably engaging said channel of said stud member, said pin having an open side extending toward said insertion end when inserted into said slot.

* * * * *